United States Patent [19]
Morimoto

[11] Patent Number: 4,733,312
[45] Date of Patent: Mar. 22, 1988

[54] TIME-BASE CORRECTOR

[75] Inventor: Takeshi Morimoto, Osaka, Japan

[73] Assignee: Matsushita Electric Industrial Co., Ltd., Osaka, Japan

[21] Appl. No.: 819,508

[22] PCT Filed: Apr. 22, 1985

[86] PCT No.: PCT/JP85/00223

§ 371 Date: Dec. 20, 1985

§ 102(e) Date: Dec. 20, 1985

[87] PCT Pub. No.: WO85/05001

PCT Pub. Date: Nov. 7, 1985

[30] Foreign Application Priority Data

Apr. 24, 1984 [JP] Japan ................................ 59-82162
Jul. 11, 1984 [JP] Japan ............................... 59-143504
Jul. 11, 1984 [JP] Japan ............................... 59-143508

[51] Int. Cl.$^4$ .................... H04N 5/783; H04N 5/93
[52] U.S. Cl. ................................. 360/10.1; 358/336;
358/337; 358/339; 360/36.1; 360/36.2;
360/38.1; 360/37.1
[58] Field of Search ............... 360/36.1, 36.2, 38.1,
360/37.1, 10.1, 10.3; 358/336, 337, 339

[56] References Cited
U.S. PATENT DOCUMENTS 4,251,830 2/1981 Tatomi ............................. 360/36.2
4,409,627 10/1983 Eto .................................... 360/36.1

FOREIGN PATENT DOCUMENTS 153518 3/1979 Japan .
132179 10/1980 Japan .
35541 12/1980 Japan .

Primary Examiner—Alan Faber
Attorney, Agent, or Firm—Spencer & Frank

[57] ABSTRACT

A time-base corrector for a video tape recorder capable of slow motion reproduction, in which the time-base correction is effected by the control of write into and read from a memory circuit of digitized reproduction video signal in such a manner that even if a dropout occurs of the vertical sync signal required for address control of the write/read operation, a forecast V signal from a V forecasting circuit is prepared and used thereby to eliminate the vertical fluctuations of the image on the monitor screen completely. It is also possible to produce a high-quality image completely free of the vertical fluctuation even at the time of special reproduction changing in V signal internals.

5 Claims, 12 Drawing Figures

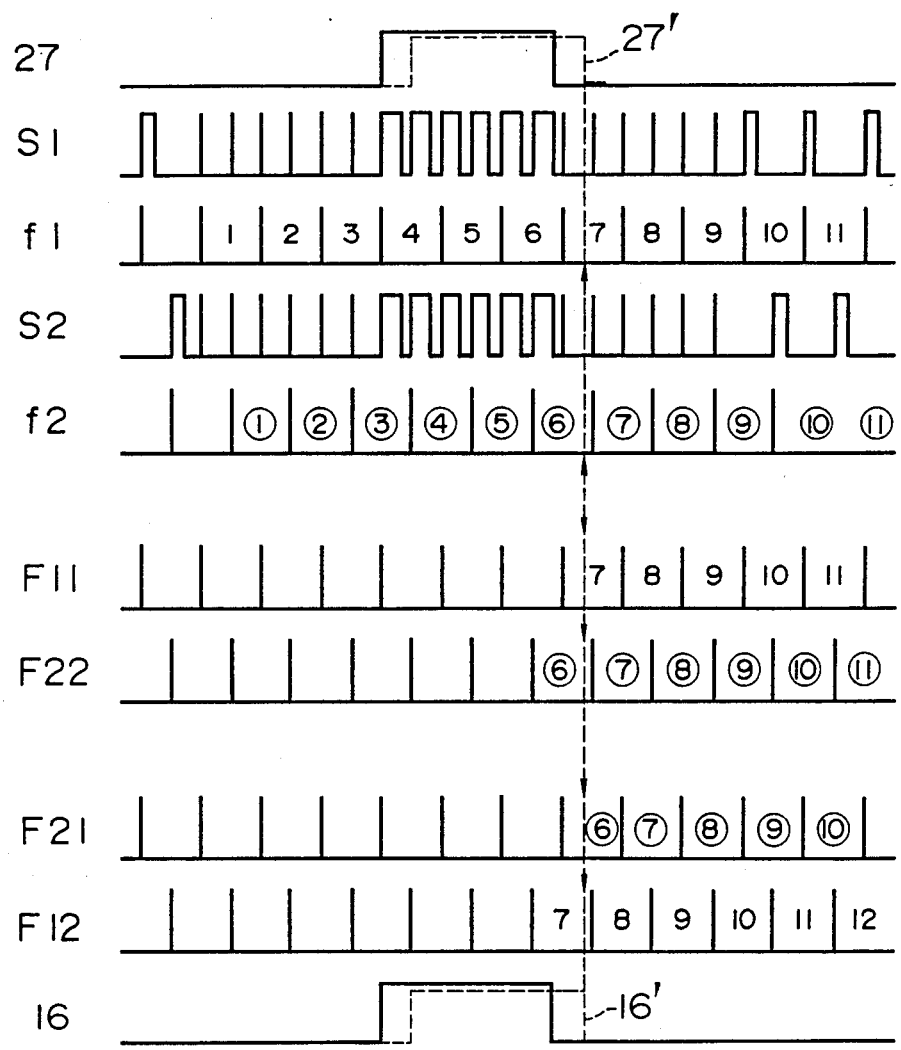

TIME-BASE CORRECTOR

BACKGROUND OF THE INVENTION

The present invention relates to a time-base corrector for a video tape recorder (VTR) capable of slow-motion reproduction.

DESCRIPTION OF THE PRIOR ART

In a broadcasting station or the like where it is necessary to render the reproduction video signal from VTR coincide with a reference sync signal of the station before transmission, a time-base corrector as shown in FIG. 1 is Indispensable.

In FIG. 1, a reproduction video signal 1 from VTR or like is supplied to both an analog-digital converter (A/D) 2 and a sync separator circuit 3. The sync separator circuit 3 supplies a write clock generator circuit 6 with a reproduction sync signal 4 separated from the reproduction video signal, and a latch circuit 7 with a reproduction vertical sync signal (hereinafter referred to as the tape V signal) 5. The write clock generator circuit 6 supplies a clock locked to the horizontal sync signal to the A/D 2 and a memory circuit 8 on the one hand and a signal ($f_H$) 10 of the horizontal sync period to a write line address counter 9 on the other hand. Also, a read clock generator circuit 11 produces a clock on the basis of a reference sync signal 12 from an external source and applies the same to the memory circuit 8 and a digital-analog converter (D/A) 13, while at the same time applying a vertical sync signal (hereinafter referred to as the VP signal) and a horizontal sync signal ($F_H$) 15 contained in the external reference sync signal to a read line address counter 14. The write line address counter 9 and the read line address counter 14 count the $f_H$ and $F_H$ signals respectively to prepare a line address, which line address is applied to the memory 8 through a switch circuit 17. The latch circuit 7 fetches the write line address when the tape V signal is applied thereto, and loads the fetched line address on the read line address counter 14 when the VP signal 16 is applied thereto, thereby rendering the write line address with the tape V signal 5 applied thereto coincide with the read line address with the VP signal 16 applied thereto.

Nevertheless, the reproduction video signal 1 from VTR may sometimes lacks the tape V signal 5 due to a dropout or like. In such a case, the operation of the latch circuit 7 becomes unstable, with the result that the output video signal of the time-base corrector fluctuates vertically on the monitor screen.

In the case of VTR carrying a movable head for the purpose of noiseless slow motion, on the other hand, two tape V signals 5 may appear in succession in a field or may not appear at all as described later. It is also impossible to obtain a stable image in such a case, too.

Specifically, in the VTR for performing noiseless slow-motion reproduction with a movable head, the time intervals of adjacent V signals are not fixed, but two V signals may appear successively or a very irregular V signal is generated. Now, the process of generation of an irregular V signal will be explained with reference to FIGS. 2 and 3.

FIG. 2 is a schematic diagram showing the manner in which the tape and video heads of the 2-head helical scan VTR run. The two heads including A head 18 and B head 19 are mounted at positions 180° opposite to each other on the circumference of a rotary cylinder 20, and rotate in the direction of arrow 21. A magnetic tape 22 is wound by more than 180° on the rotary cylinder 20 and runs in the direction of arrow 23.

FIG. 3 shows a recording pattern on the tape formed by the heads. The magnetic tape 22 runs along the direction of arrow 23, while the A head 18 and B head 19 are driven in the direction of arrow 21 alternately thereby to trace the recording tacks 24, 25 and 26 in that order on the magnetic tape 22. In the drawing, parts 24', 25', 26'; 24", 25", 26" designated by dashed lines represent overlapped recording area. In order to eliminate any discontinuities of the video signal in joint portions of the reproduction video signal from A head 18 and B head 19 at the time of reproduction, the magnetic tape 22 is wound more than 180° normally on the rotary cylinder 20, thereby causing the overlapped area. In the drawing, the hatched portion shows a recording area for the vertical sync signal (V signal).

In reproduction mode, the A head 18 normally scans the line section P-Q. When the A head 18 reaches point Q, the B head 19 is located at point P'. Then, the B head 19 scans the line section P'-Q', followed by the A head 18 scanning the line section P"-Q".

However, the operation is different at the time of noiseless slow motion reproduction. Am example will be explained below with reference to the case when the tape is stationary.

In still mode, the locus of the A head 18 coincides with that of the B head 19, such as shown by the locus represented by the line section P'-Q. In midst of the locus, however, the transfer from the recording track 25 to the recording track 24 causes a noise band on the monitor screen.

In order to prevent this, each of the A head 18 and the B head 19 is made up of a head movable in a direction perpendicular to the track scanning. This movable head is driven in wedge fashion and is controlled in such a manner that the locus of the A head 18 and B head 19 comes on the line section P'-R in still mode. In this manner, only one recording track is scanned within a field, thereby preventing a noise band.

Further, the recording track of the helical scan VTR contains a displacement of the horizontal sync signal position ($\alpha H$) as shown in FIG. 3. Explanation will be made below assuming that $\alpha H = 2.5H$.

In the case of NTSC system, the line section P-Q contains 262.5 H or horizontal scanning periods representing one field. The line section P'-R mentioned above has $\alpha_H$ more periods and is comprised of 265H as a field.

The line section P'-R shown in FIG. 3 has two V signals appearing in a field. As far as the original V signal indicated by the hatching at the lower part of the drawing is concerned, however, the number of the horizontal scanning periods contained in the time length from the reproduction of the V signal by A head to the reproduction of the same V signal by B head is fixed to 265H.

In the case of assuming a slow motion reproduction at ½ speed, for example, the A head 18 and B head 19 scan the line section P"-R' after their scanning the line section P'-R. In this case, there exist 265H during the time length from the reproduction of the V signal by the A head 18 on the line section P'-R to the reproduction of the V signal by the B head 19 on the same track, and next there exists 262.5H during the time length from the reproduction of the V signal by the B head 19 on the line section P'-R to the reproduction of the V signal by the A head 18 on the line section P"-R'. This is apparent from the fact that the point P" is ahead of point P' by αH in the diagram. In short, the intervals of V signal at the time of ⅓ slow motion reproduction alternate between 265H and 262.5H. In other slow motion reproduction, 0-1 times normal tape speed, the intervals of V signal are also a combination of 262.5H and 265H. Specifically, the interval of 265H is involved when the same track is reproduced, and 262.5H when the next track is reproduced. Further, in the case of 1-2 times normal tape speed as in normal run and that of the track next but one are combined, so that the V-signal intervals are a combination of 262.5H and 260H. The slow motion reproduction at a speed of 0 to −1 times normal tape speed includes the reproduction of the same track and the jump to the track in the reverse direction, and therefore, the V-signal intervals at the time of reverse reproduction are a combination of 265H and 267.5H.

As explained above, the V-signal position changes very irregularly at the time of special reproduction, and therefore if the tape V signal 5 is applied directly to the latch circuit 7 as shown in FIG. 1, a vertical jitter occurs on the image.

The field-by-field relationship between the reproduction video signal 1 and the external reference sync signal 12 at the time of slow motion reproduction shows the appearance of alternating relationships in one of which the fields of both the signals coincide in a some case and the fields become opposite in other. The vertical jitter occurs when a reproduction is being made of a field opposite to the field of the external reference sync signal 12. The causes of this vertical jitter will be explained with reference to the operation of the latch circuit 7 shown in FIG. 4.

In FIG. 4, reference numeral 5 designates a tape V signal in FIG. 1, and reference characters S1 and S2 the reproduction sync signals of the first and second fields respectively. Characters f1 and f2 designate $f_H$ signals for the first and second fields respectively ($f_H$ signal 10 in FIG. 1). Numerals 1 to 11, and ① to ⑪ in the respective waveforms indicate address values of the write line address counter 9. The latch circuit 7 latches the address value in the waveforms f1 and f2 at the trailing edge of the tape V signal 5. In the drawing, the address value (6) or (⑥) is latched.

F11, F22, F21, F12 designate $F_H$ signals shown in FIG. 1, and the numerals in the waveform designate the address value of the read line address counter 14.

In a time-base corrector, the tape V signal 5 generally goes ahead of the VF signal 16. For the drawing convenience, however, they are assumed to have the same timing.

The waveforms F11, F22 concern the case where the fields of the reproduction sync signal and the external reference sync signal are coincident with each other, and the latched address mentioned above is loaded in the manner shown in the waveforms F11 and F22 at the trailing edge of the VP signal 16.

In the normal reproduction, the positional relations between the tape V signal 5 and the write addresses written in each of the waveforms f1 and f2 coincide with those between the VP signal 16 and the read addresses written in each of the waveforms F11 and F12, with the result of producing normal reproduction image.

On the other hand, the read address with the field relations between the reproduction sync signal and the external reference sync signal reversed is such that the write address shown within the waveform f1 (f2) is loaded in F12 (F21) at the trailing edge of the VP signal 16. This state occurs transiently at the time of the slow motion reproduction, and the read address value shown in the waveform F12 is delayed 0.5H from the write address shown in the waveform f1, while the read address shown in the waveform F21 advances 0.5H as compared from the write address shown in the waveform f2.

This phenomenon will be explained with reference to FIG. 5. FIG. 5 shows a schematic diagram of a monitor screen. At the time of normal reproduction, the reproduction sync signal S1 (FIG. 4) of the first field and the reproduction sync signal S2 (FIG. 4) are interlaced with each other, so that the write addresses line written in the waveforms f1 and f2 (FIG. 4) appear first in the form of lines 6, 7, ..., 10 in that order in the first field as shown in FIG. 5a, followed by the lines ⑥, ⑦, ⑧, ... ⑩ in that order in the second field. What must be noted here is that the line ⑥ is interlaced between lines 6 and 7, and other lines similarly subsequently.

When the field of the reproduction video signal fails to coincide with that of the external reference sync signal, on the other hand, the result is as shown in FIG. 5b. Specifically, there are fields 6, 7, and so on in which the line address advances 0.5H and the fields 6,7 and so on in which it is delayed by 0.5H, mixed with each other. This causes a failure of interlace, thereby leading to vertical fluctuations on the monitor screen.

Also, in the case where only the first field is reproduced as still mode, for instance, only the waveform f1 (FIG. 4) is generated but not the waveform f2 (FIG. 4). In this mode, too, the external reference sync signal is accompanied by alternating fields, and therefore the read address as shown in the waveforms F11, F12 is set. In this case, the signal is delayed by 0.5H in the second field of the external reference sync signal. When the second field is reproduced in still mode, by contrast, the signal is advanced by 0.5H in the first field of the external reference sync signal.

Referring to FIG. 5, the monitor screen in still mode is shown by d and f of the diagram. Characters c and e, on the other hand, are indicative of the reproduction video signal shown in direct form on the monitor by way of explanation. More specific, character c represents the reproduction only of the first field, and the character e the reproduction of the second field alone. At d, the image with the external reference sync signal in the first field is indicated as c, and when the external reference sync signal is in the second field, is interlaced in the direction one line behind. As a result, the image position is displaced downward on the monitor screen as compared with the normal reproduction.

When the reproduction field is the second field, by contrast, as shown in FIG. 5f, the form of e of FIG. 5 is displayed directly to the extent that the external reference sync signal is in the second field, and interlaced in such a direction as to advance a line when the external reference sync signal is in the first field. As a result, the image position is displaced on the screen by 0.5H upward as compared with normal reproduction. In short, a vertical fluctuation of the image by an amount equivalent to 1H occurs at the time of reproduction processes such as feeding.

As will be apparent from the foregoing description, in the prior art, vertical jitters were caused in the image on the monitor screen due to the lack of the vertical sync signal due to a dropout or like, irregular generation of the vertical sync signal generated at the time of noiseless slow reproduction and the above-mentioned reverse field.

DISCLOSURE OF THE INVENTION

In view of these facts, the object of the present invention is to provide a time-base corrector in which vertical fluctuations are not caused in the image on the monitor screen.

According to one aspect of the present invention, there is provided a time-base corrector comprising a memory for storing a reproduction video signal reproduced from a video tape recorder, a write/read address generator circuit for generating a write and a read address for each line for the memory, a sync separator circuit for extracting a reproduction vertical sync signal and a reproduction horizontal sync signal from the reproduction video signal, a vertical sync signal forecasting circuit for forecasting the position of the reproduction vertical sync signal in the field immediately following the extracted reproduction vertical sync signal by counting a predetermined number of signals synchronous with the extracted reproduction horizontal sync signal and thereby generating a forecast vertical sync signal, and a vertical synd signal compensation circuit impressed with the extracted reproduction vertical sync signal for outputting the impressed reproduction vertical sync signal normally and outputting the forecast vertical sync signal in the absence of the extracted reproduction vertical sync signal, in which the write line address of the memory is latched by the output of the vertical sync signal compensation circuit and the latched address is loaded as a read line address on the write/read address generator circuit at the position of the vertical sync signal extracted from an external reference sync signal, thereby eliminating any vertical fluctuations in the image on the monitor screen even when the tape V signal is lacking due to dropouts or like.

According to another aspect of the present invention, there is provided a time-base corrector comprising a smoothing circuit for preparing average data on the present and preceding lines and a field identification circuit for discriminating and identifying fields of the reproduction video signal and the external reference sync signal; wherein the write line address of the memory is latched at the first vertical reference position obtained from the vertical sync signal of the reproduction video signal, the latched address is loaded as a read line address on the write/read address generator circuit at the second vertical reference position obtained from the vertical sync signal of the external reference sync signal; wherein when the field of the reproduction video signal is different from that of the external reference sync signal the data from the smoothing circuit is used as read data, and the operation timing of selected one of the loading or latching or line address is appropriately shifted by one horizontal scanning period when the reproduction video signal is of an even-numbered (such as second or fourth) field with the external reference sync signal being of a odd-numbered (first or third) field or when the reproduction video signal is of an odd-numbered field with the external reference sync signal being of an even-numbered field; and wherein whenever the field of the reproduction video signal fails to coincide with that of the external reference sync signal, the positional relation of the read line address and the external reference sync signal is compared with that of the write line address and the reproduction vertical sync signal, so that stabilization of the vertical fluctuations on the screen image is realized by a 0.5H shift and the image position is moved on the screen by 0.5H shift operation of the smoothing circuit, thus producing an image completely free of vertical fluctuations.

BRIEF DESCRIPTION OF THE DRAWINGS

FIG. 12 is a signal diagram showing a line address setting according to another embodiment of the present invention.

DESCRIPTION OF THE PREFERRED EMBODIMENTS

Figure 1:
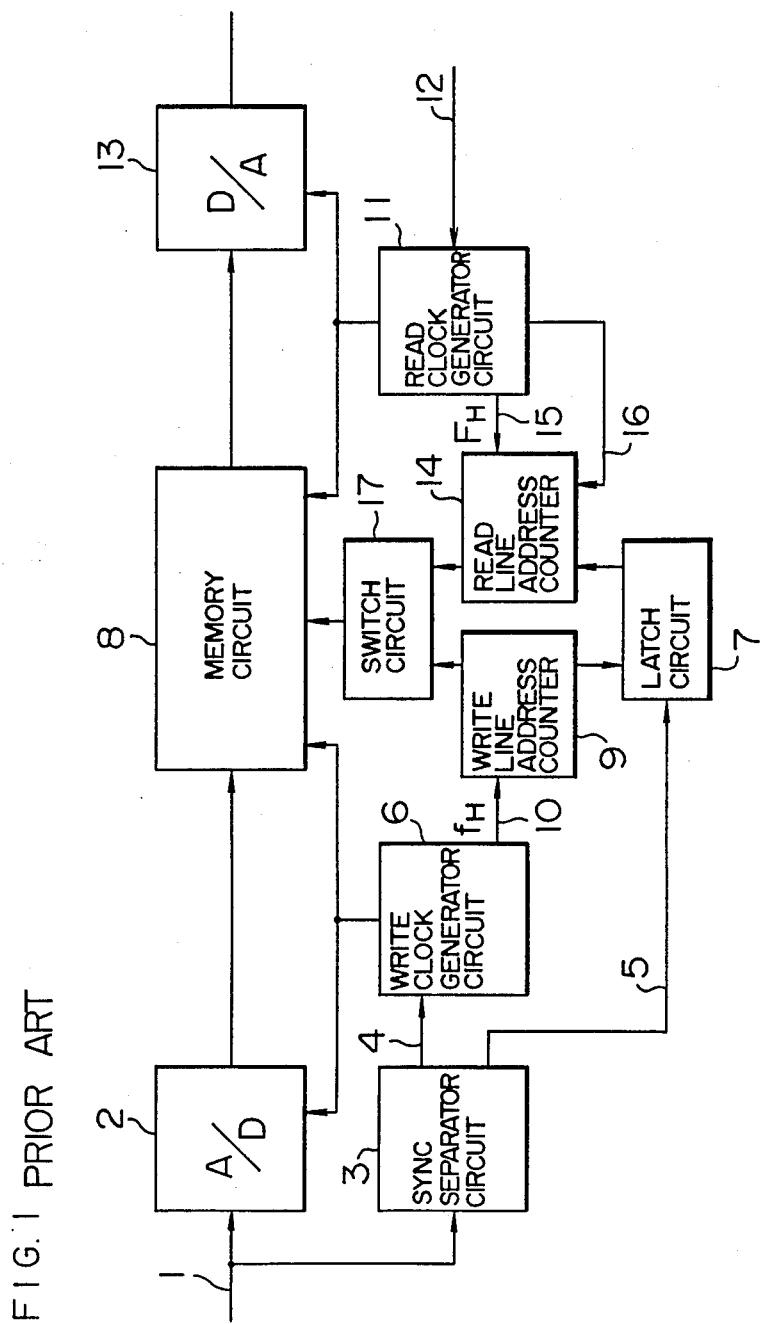
FIG. 1 is a block diagram showing a conventional time-base corrector.
Figure 2:
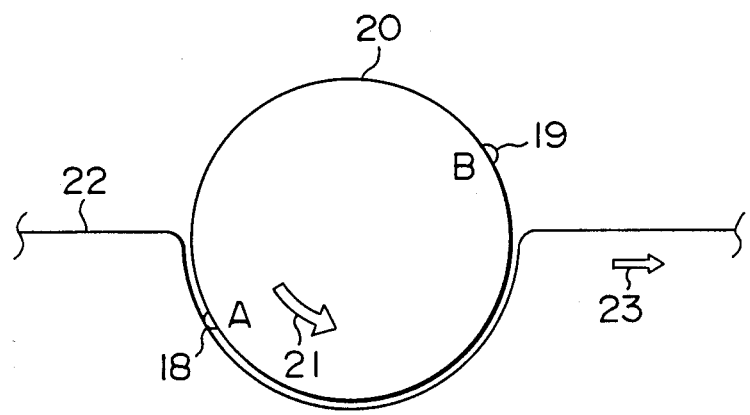
FIG. 2 is a plan view showing the manner in which the tape and the video head of a two-head helical scan VTR are driven.
Figure 3:
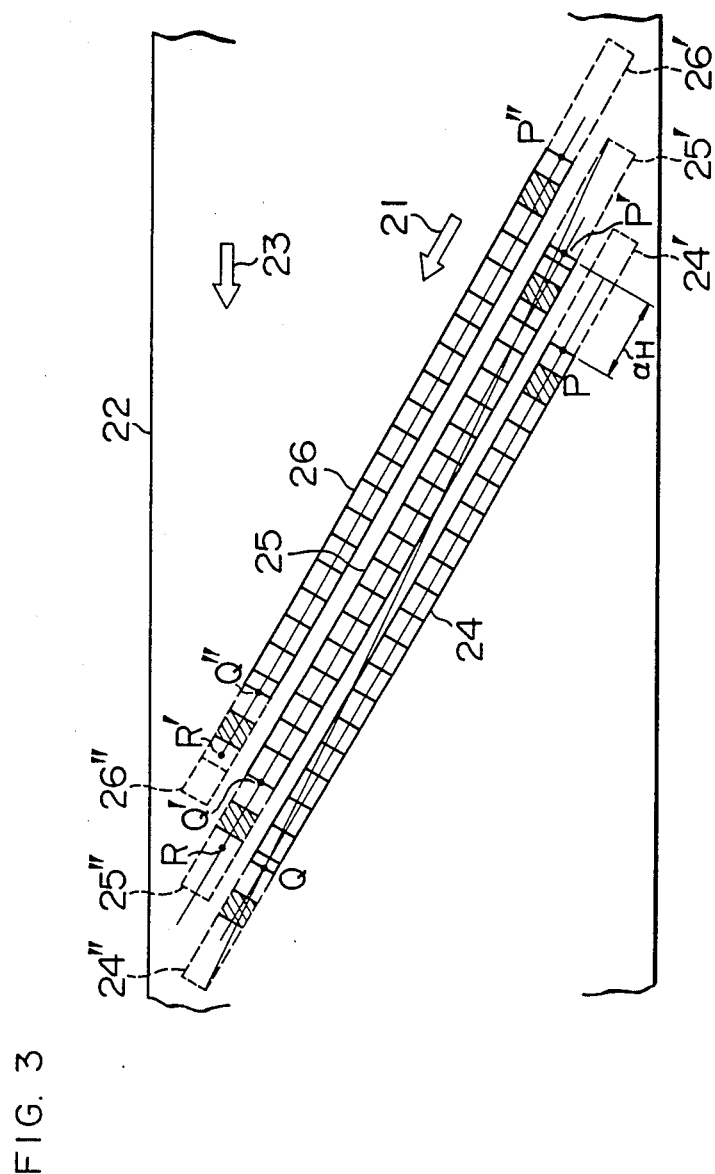
FIG. 3 is a diagram for explaining the locus of the head at the time of a special reproduction.
Figure 6:
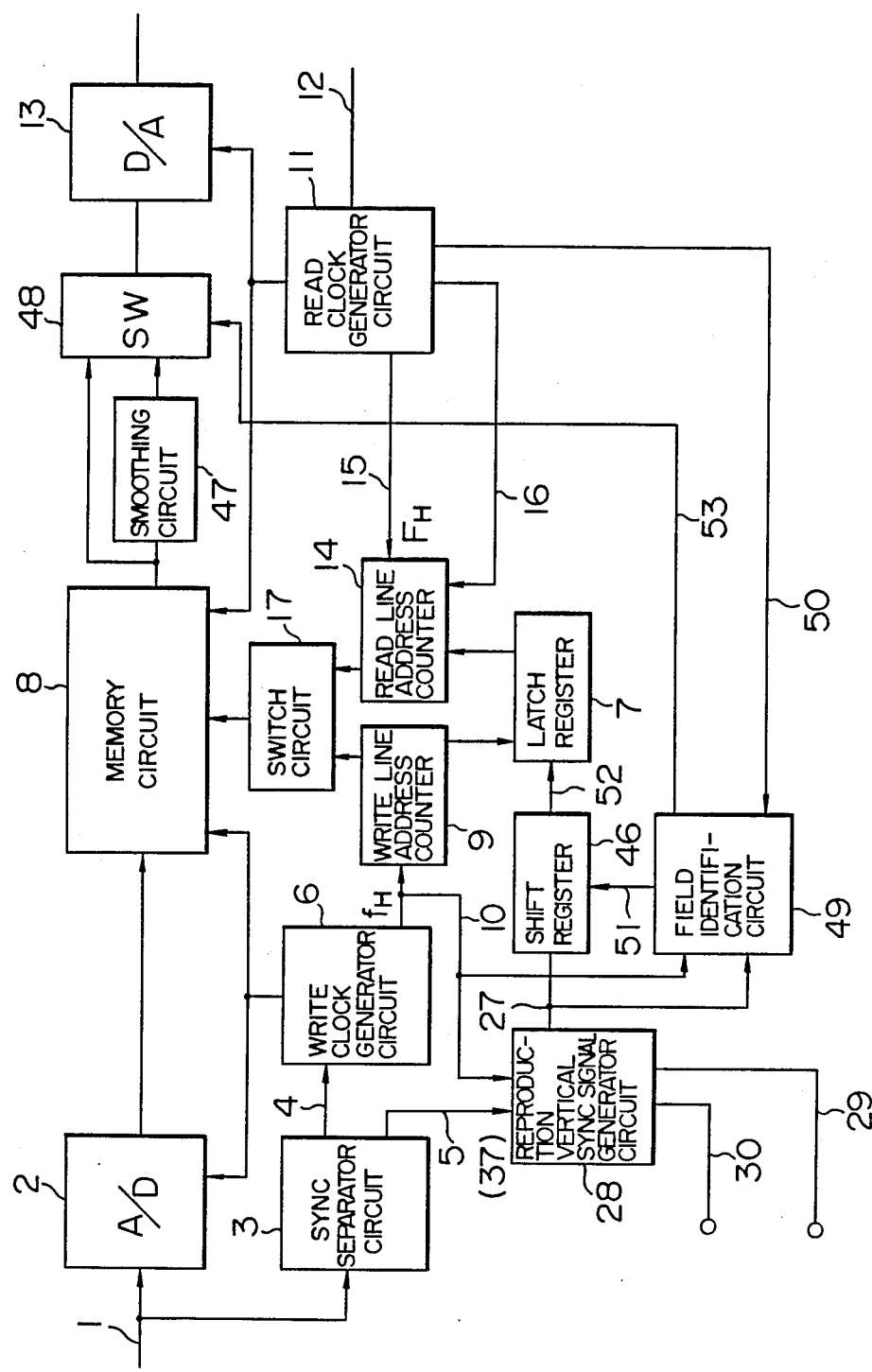
FIG. 6 is a block diagram showing a time-base corrector according to an embodiment of the present invention.

FIG. 6 shows a time-base corrector according to an embodiment of the present invention. In the diagram, the component elements identical to those in the prior art system shown in FIG. 1 are designated by the same reference numerals as in FIG. 1. The system comprises, in addition to the configuration of the prior art shown in FIG. 1, a reproduction vertical sync signal generator circuit 28 for performing such operations as correction in the case of a dropout of the reproduction vertical sync signal, a field identification circuit 49 for identifying the fields of the reproduction video signal 1 and the external reference sync signal 12 and smoothing the video signal or controlling the line address shift or like, a shift register 46 controlled by the field identification circuit 49 for shifting the latch timing of the write address, a smoothing circuit 47 for preparing the data inserted or interpolated in the video signal, and a switch circuit (SW) 48 for changing-over the signal direct from the memory circuit 8 and the signal from the smoothing circuit 47.

In FIG. 6, the reproduction video signal from VTR or like is applied to the analog-digital converter circuit (A/D) 2 and the sync separator circuit 3. sync seperator circuit 3 supplies a reproduction horizontal sync signal 4 to a write clock generator circuit 6, and a reproduction vertical sync signal (tape V signal) 5 to a reproduction vertical sync signal generator circuit 28. The write clock generator circuit 6 supplies a clock phase-locked with the reproduction horizontal sync signal 4 to the A/D 2 and the memory circuit 8, while at the same time supplying a signal (fH) 10 of the horizontal sync period to the write line address counter 9. The read clock generator circuit 11, on the other hand, applies the clock to the memory circuit 8 and the digital-analog converter circuit (D/A) 13 on the basis of the external reference sync signal 12, while at the same time supplying the read line address counter 14 with the horizontal sync signal ($F_H$) 15 and the vertical sync signal (VP signal) 16 contained in the external reference sync signal. The write line address counter 9 and the read line address counter 14 count the $f_H$ signal 10 and the $F_H$ signal 15 respectively to prepare a line address, which is applied to the memory circuit 8 through the switch circuit 17.

Figure 7:
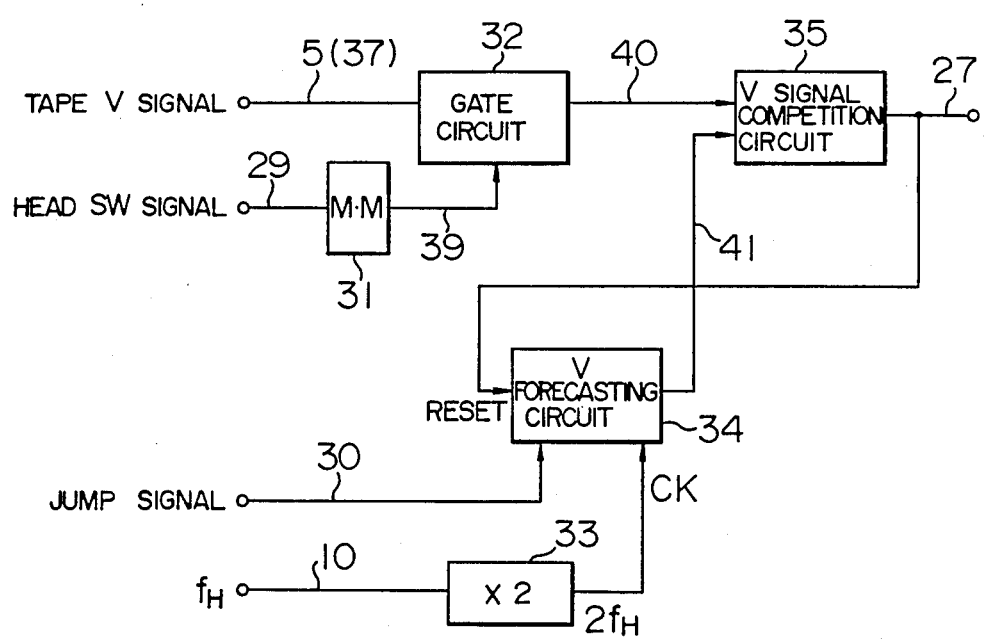
FIG. 7 is a block diagram showing a specific configuration of a reproduction vertical sync signal generator circuit according to an embodiment of the present invention.

The reproduction vertical sync signal generator circuit 28 produces a reproduction reference vertical sync signal 27 on the basis of the tape V signal 5, $f_H$ signal 10, the video head switch signal 29 and the jump signal 30. The configuration of this reproduction vertical sync signal generator circuit 28 is shown in FIG. 7.

In this embodiment, the video head switch signal (head SW signal) 29 has a switching position in the vertical blanking period preceding the vertical sync signal recorded at about the scanning start position of the video head. The jump signal 30 is a signal indicating the reproduction track jump signal. In FIG. 7, numeral 31 designates a monostable multivibrator (M.M) for producing a pulse 39 triggered at the switching position of the head SW signal 29. This pulse 39 is used as a gate pulse for the gate circuit 32. Numeral 33 designates a multiplier circuit for generating a signal $2f_H$ twice higher in frequency than the horizontal sync signal and supplying the same signal as a clock ck to the vertical sync signal forecasting circuit (V forecasting circuit) 34. The V forecasting circuit 34 includes a counter, which after counting a predetermined number of clocks, produces a forecast vertical sync signal (forecast V signal) 41. The predetermined number counted by the V forecasting circuit 34 is changed by the signal indicating the reproduction track jump information of the jump signal 30. Numeral 35 designates a vertical sync signal competition circuit (hereinafter preferably called V signal compensation circuit), which is supplied with the tape V signal 40 from the gate circuit 32 and the forecast V signal 41 from the V forecasting circuit 34, and produces the tape V signal normally. When the tape V signal 40 is lacking, however, the circuit 35 produces the forecast V signal 41 thereby to produce a stable reproduction reference vertical sync signal 27.

Figure 8:
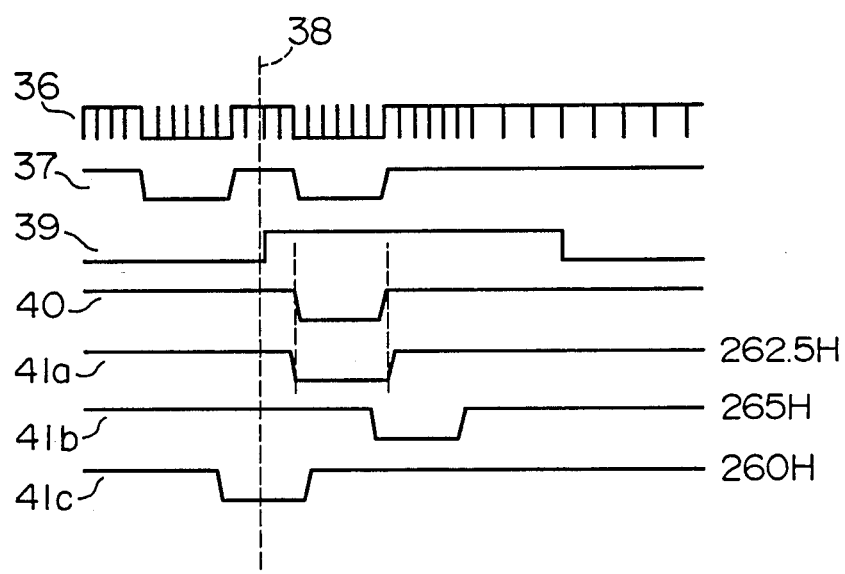
FIG. 8 is a diagram showing waveforms for explaining the operation of the same embodiment.

As shown in FIG. 8, assume that the sync signal 36 is obtained at the sync separator circuit 3 at the time of a special reproduction. The vertical sync extraction circuit (not shown) included in the sync separator circuit 3 produces a signal such as designated by 37 as the tape V signal 5, so that two V signals are produced on both sides of the head switching position 38.

In the case where the head switching position 38 is located in the vertical blanking period before the vertical sync signal recorded near the scanning start position of the video head, however, the V signal before the head switching position 38 is not important. For stabilizing the vertical jitter, a gate pulse as designated by 39 is produced by M.M. 31 with reference to the head switching position 38 to provide a gate signal for the gate circuit 32. This gate pulse 39 is used to eliminate the unnecessary V signal from the tape V signal 5 (37) produced from the sync separator circuit 3, thus producing a V signal as designated by 40. Numerals 41a, 41b, 41c designate various forecast V signals which were introduced from the tape V signal preceding by one field and were dependent on the track jump information. The forecast V signal 41a is introduced in the case of FIG. 8. The V forecasting circuit 34 is reset by the reproduction reference vertical sync signal 27 that is the forecast V signal or the tape V signal applied to the V signal compensation circuit 35 one field before, and counts the double clock $2f_H$ of the horizontal sync frequency $f_H$ for the purpose of V forecasting. At the time of slow motion reproduction, the V signal intervals increase or decrease by units of $\alpha_H$ depending on the track jump as mentioned above, and therefore the V forecasting circuit 34 shifts the position of the forecast V signal by units of $\alpha_H$ on the basis of the track jump information, that is, the count number is changed.

Figure 9:
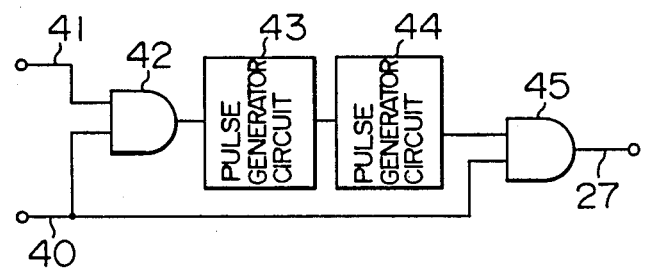
FIG. 9 is a circuit diagram showing a configuration of a vertical sync signal compensation circuit according to the specific example of FIG. 7.
Figure 10:
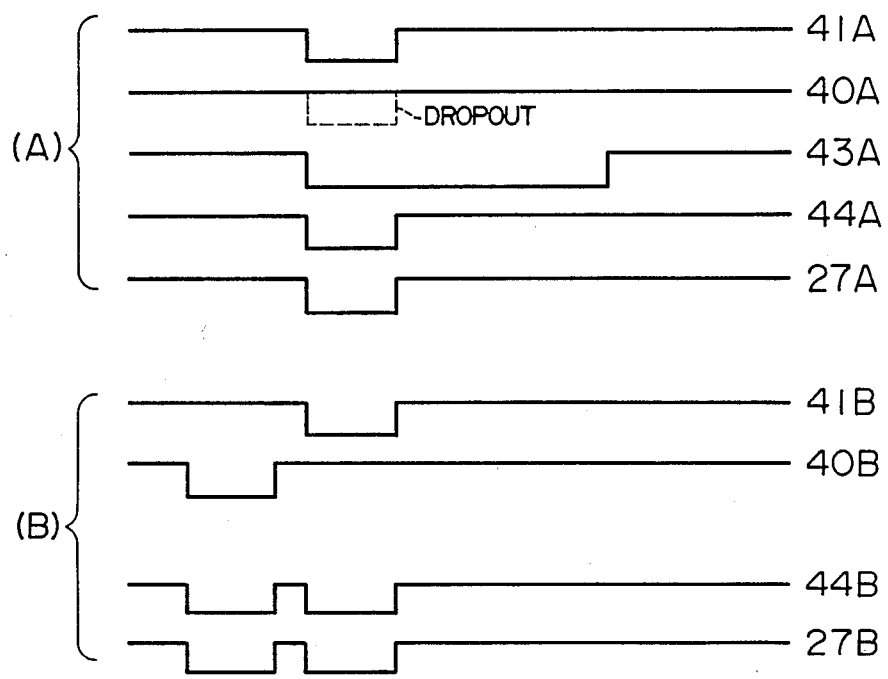
FIGS. 10(A) through 10(E) are timing charts showing the operation of the circuit of FIG. 9.
Figure 10:
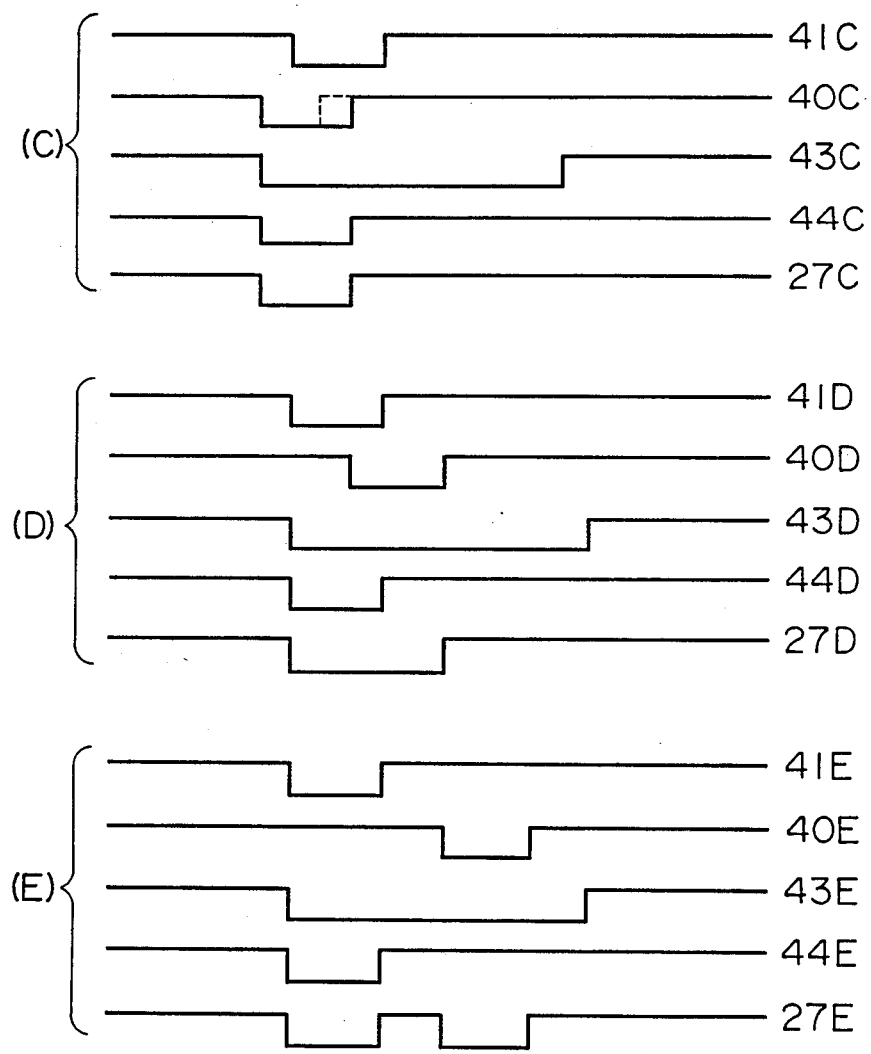

FIG. 9 is a circuit diagram showing a detailed configuration of the V signal compensation circuit 35, and FIG. 10 is a timing chart for explaining the operation of the circuit of FIG. 9.

In FIG. 9, numeral 42 designates an AND gate impressed with the tape V signal 40 and the forecast V signal 41 of FIG. 7. Numerals 43, 44 designate pulse generator circuits each for producing a negative-going pulse of a predetermined duration at the failing edge of the input signal. These pulse generator circuits are comprised, for example, of monostable multivibrators. The pulse generator circuit 44 produces a pulse of 3H width (H designates a horizontal scanning period) equal to the vertical sync pulse width in the case of a standard television signal. The pulse generator circuit 43 produces a pulse of a width longer than about 10H in this embodiment. Numeral 45 designates an AND gate, which produces an AND output of the tape V signal 40 and the output of the pulse generator circuit 44 as a reproduction reference vertical sync signal 27.

Now, the operation will be explained with reference to FIG. 10. The reference numerals in this diagram correspond to those in the circuit of FIG. 9 where the same component elements as those in FIG. 10 are designated by the same numerals. In FIG. 10A, if the tape V signal 40A is lacking such as by dropout, the pulse generator circuit 43 generates a pulse 43A at the leading edge of the forecast V signal 41A, and the pulse generator circuit 44 further produces a spurious V signal 44A. Since the AND gate 45 lacks the tape V signal 40A, the AND gate 45 produces a spurious V signal, and the trailing edge of the spurious V signal makes up a vertical reference.

If the output of the AND gate 42 is supplied directly to the pulse generator circuit 44 in the absence of the pulse generator circuit 43, the pulse generator circuit 44 generates two spurious pulses at the leading edge of the tape V signal 40B and at the leading edge of the forecast V signal 41B as shown in FIG. 10B. When these signals are applied to reset terminal of the V forecasting circuit 34 shown in FIG. 7 or applied to the latch circuit 7 through the shift register 46 shown in FIG. 6, for example, these circuits regard the trailing edge of the pulse as a vertical reference, so that circuit operations such as reset are effected twice by the vertical reference 27B. As a result, the resulting state becomes equivalent to the case where trailing edge of the forecast V signal 41B has been supplied, and the information of the tape V signal 40B is discarded undesirably. To prevent this inconvenience, the pulse generator circuit 43 is added. The pulse duration of this pulse generator circuit 43 is set to more than the maximum displacement between forecast V signal and the tape V signal.

FIG. 10C shows the case in which the tape V signal 40C goes ahead of the forecast V signal 41C, and the spurious V signal 44C is produced at the leading edge of the tape V signal 40C while the vertical reference 27C is produced from the AND gate 45. Even if the trailing edge of the tape V signal 40C is lacking by a dropout as shown in the diagram, the vertical reference remains unchanged and stable.

FIG. 10D, on the other hand, shows the case in which the forecast V signal 41D goes ahead of the tape V signal 40D. In this case, the spurious V signal 44D is generated at the leading edge of the forecast V signal 41D, but the tape V signal 40D is added by the AND gate 45, so that the vertical reference 27D is effective at the trailing edge of the tape V signal 40D.

Further, FIG. 10E is the case in which the tape V signal 40E is far behind the forecast V signal 41E. In this case, two vertical references 27E are generated. Since subsequent circuits are reset or otherwise operated at the trailing edge of the tape V signal 40E, however, no problem is posed at all.

Now, explanation will be made in detail about the operation of the field identification circuit 49, the shift register 46, the smoothing circuit 47 and the switch circuit (SW) 48 according to the present embodiment.

The field identification circuit 49 discriminates to identify the field of the reproduction video signal 1 depending upon the phase relationship between the reproduction reference vertical sync signal 27 and the $f_H$ signal 10, and compares it with the field signal 50 of the external reference sync signal 12 from the read clock generator circuit 11 in order to control the shift register 46 and the SW 48. The shift register 46 is controlled by the first control signal 51 from the identification circuit 49 so that a signal in the form of the reproduction reference vertical sync signal 27 and a signal delayed by one horizontal scanning period are switched with each other and the resultant signal is applied as a latch signal to the latch circuit 7.

The smoothing circuit 47, which includes a memory element for storing one horizontal scanning period, stores the signal from the memory circuit 8, and averaging out the signal one line before obtained and a signal from the memory circuit 8, supplies as a smoothed signal to the SW 48.

The SW 48 selectively applies to the D/A 13 the signal direct from the memory circuit 8 and the signal from the smoothing circuit 47 by the second control signal 53.

The above-mentioned control operation is summarized as shown in Table 1. The smoothing operation is always effected when the reproduction field fails to coincide with the field of the external reference sync signal.

TABLE 1

| Reproduction field | Reference sync field | Line shift (available or unavailable) | Smoothing (available or unavailable) |
| --- | --- | --- | --- |
| First | First | Unavailable | Unavailable |
| First | Second | Available | Available |

TABLE 1-continued

| Reproduction field | Reference sync field | Line shift (available or unavailable) | Smoothing (available or unavailable) |
| --- | --- | --- | --- |
| Second | First | Unavailable | Available |
| Second | Second | Unavailable | Unavailable |

Figure 4:
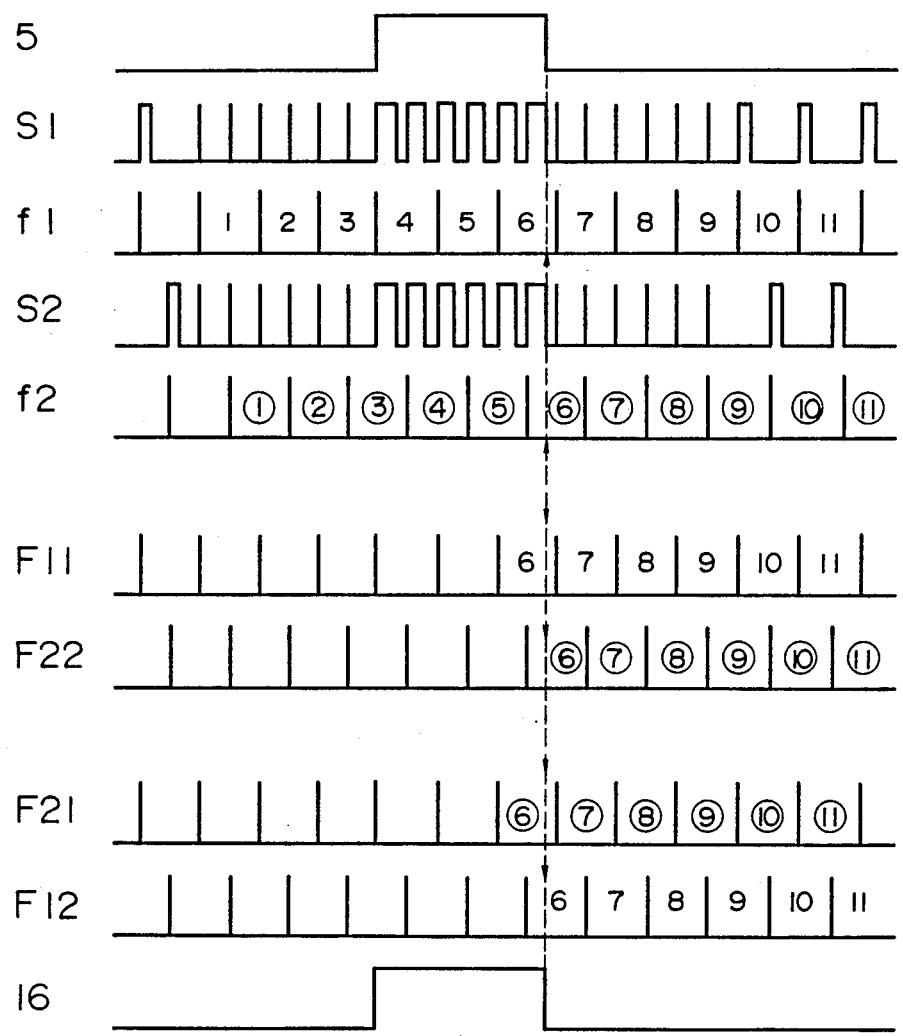
FIG. 4 is a signal diagram showing a line address setting for a conventional time-base corrector.

The shift of the read line is available only when the reproduction field is the first field and the field of the external reference sync signal is the second field, advancing the read line address by one H. Discussing in the diagram of FIG. 4 showing the prior art, the read line is shifted in a direction to advance the read line address written in the waveform F12 by 1H, while discussing with reference to FIG. 5, it is shifted such that the line designated by dashed arrow is moved to the line advanced by 1H (two lines upward in the monitor screen of FIG. 5) in preparing the images b and d from the images a and c.

Figure 5:
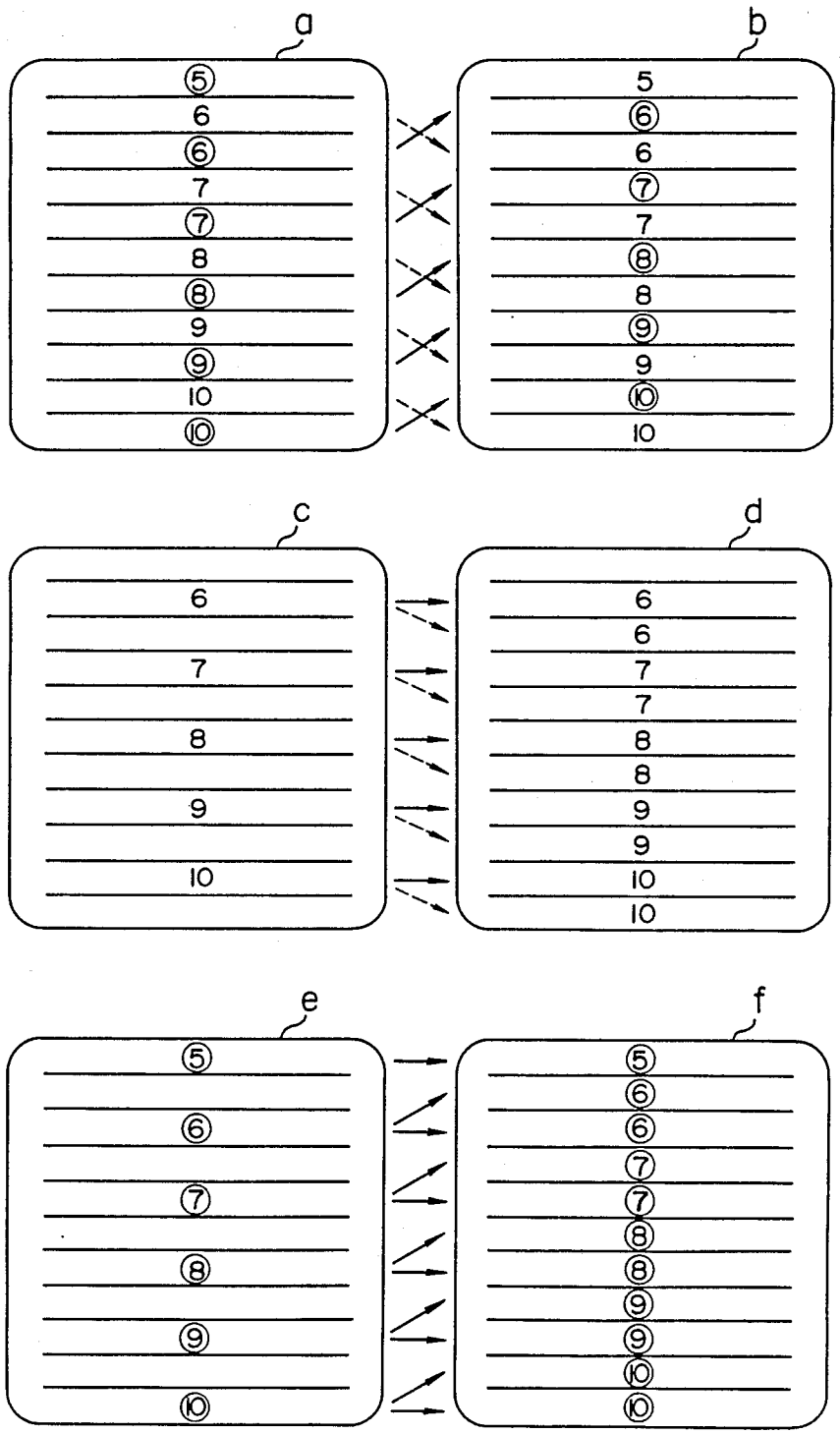
FIG. 5, consisting of a through f, is a diagram schematically showing a monitor screen of a conventional time-base corrector.
Figure 11:
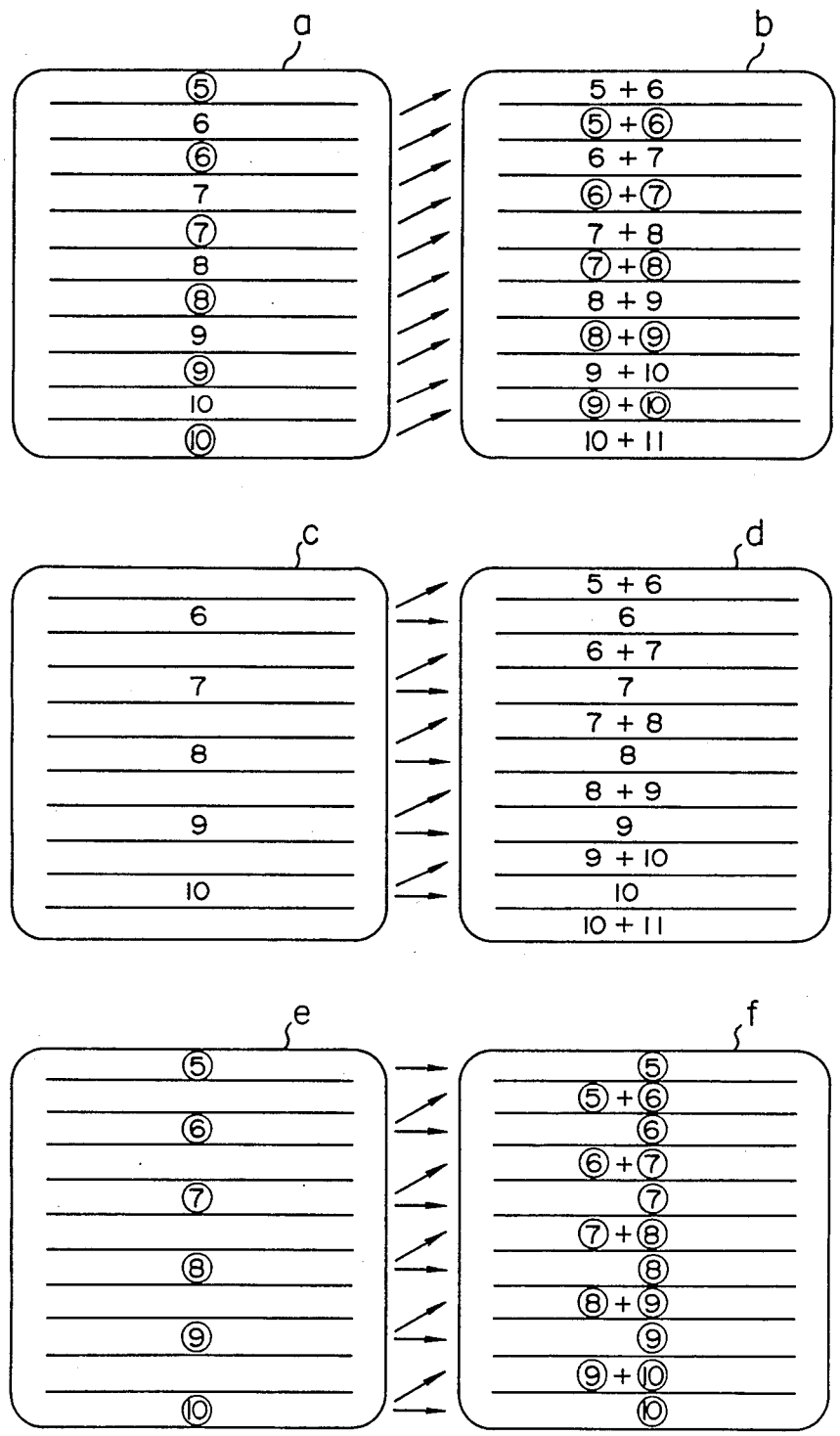
FIG. 11, consisting of a through f, is a diagram showing a monitor screen according to an embodiment of the present invention.

Specifically, the directions of arrows are indicated as shown in FIG. 11, which indicates the operation of setting the read line address and the smoothing operation according to this method on the monitor screen, and in which the six screens correspond respectively to the six screens in FIG. 5 in the field relationship between the reproduction sync signal and the external reference sync signal. In the case of FIG. 11b, every field of the reproduction sync signal is quite different from that of the external reference sync signal, and therefore the signal of each line in the Fig. is produced through the smoothing circuit 47. In the case of FIG. 11c, the reproduction sync signal field is the first field, and therefore, only the signal of the line of the second field of FIG. 11d is produced through the smoothing circuit 47. In the case of FIG. 11e, on the otherhand, the reproduction sync signal field is the second field, and therefore, only the signal of the line of the first field of FIG. 11f is produced through the smoothing circuit 47.

As described above, the time-base corrector according to this method is capable of producing a high-quality image completely free of vertical fluctuations.

In the embodiment shown in FIG. 6, the coincidence between the write and read line addresses is taken by a shift register 46 inserted between the reproduction vertical sync signal generator circuit 28 and the latch circuit 7 for controlling the latch signal. The same effect is also achieved by controlling the VP signal 16 from the read clock generator circuit 11. In the case, the line shift is generated when the reproduction field is the first field and the external reference sync signal is the second field as in the case of Table 1 representing the control of FIG. 6. This line shift, however, is different from the embodiment of FIG. 6 in that in this line shift, the load pulse (VP signal 16) is moved one line forward unlike the other three field conditions.

The same effect is also obtained by a construction of using in place of the reproduction reference vertical sync signal 27 and the VP signal 16 of the embodiment of FIG. 6 such signals advanced or delayed by an integral multiple of one horizontal scanning period.

Now, referring to FIG. 12 explanation will be made of the case in which the reproduction reference vertical sync signal 27 and the VP signal 16 are delayed 0.5H behind the tape V signal 5 and the VP signal 16 in FIG. 4. FIG. 12 shows regeneration of waveforms of FIG. 4 together with the reproduction reference sync signal 27' and the VP signal 16' by dashed line which were delayed by 0.5H. The read addresses written in the waveforms F11 and F12 are the same as in FIG. 4, but it is seen that F21 and F12 are different. In this case, with the reproduction reference vertical sync signal 27 and the VP signal 16 as a reference, the write address of the second field image (shown in f2) is set as a read address (shown in F21) at a position 0.5H behind, and the write address (shown in f1) of the first field image as a read addres (F12) at a position 0.5H ahead. Specifically, an image delay occurred in FIG. 4 when the reproduction video signal is of the first field and the external reference sync signal is of the second field, while in the case of FIG. 12, an image delay is caused when the reproduction image signal is of the second field and the external reference sync signal is of the first field. In the latter case, the present invention is applicable by the read line shift for 1H ahead reading only when the reproduction video signal is of the second field and the external reference sync signal is of the first field, as shown in Table 2.

TABLE 2

| Reproduction field | Reference sync field | Line shift (available or unavailable) | Smoothing operation (available or unavailable) |
|---|---|---|---|
| First | First | Unavailable | Unavailable |
| First | Second | Unavailable | Available |
| Second | First | Unavailable | Available |
| Second | Second | Unavailable | Unavailable |

As explained above, the address line shift conditions are divided into the Table 1 and Table 2 depending on the timings of latching and loading.

In the case where the latch signal and the load signal are located within the first half 0.5H of the pulse waveform f1 of the reproduction horizontal sync signal $f_H$ of the first field, the read address becomes as shown in FIG. 12 and the address line shift should be performed in accordance with Table 2. In the case where the latch signal and the load signal are located in the latter half 0.5H of the pulse waveform f1 of the signal $f_H$, the read address becomes as shown in FIG. 4 and the address line shift should be performed in accordance with Table 1.

By the embodiment of FIG. 6, the above explanation has been made about a system which performs all the operations including the gating of the unnecessary V signal using the head switch signal, the V forecasting circuit and V signal compensation circuit, the control of the V forecasting circuit by a jump signal, the line address shift at the time of reverse-field reproduction and the line interpolation. Even when each of these elements is used separately, however, the vertical jitter is considerably improved as compared with the prior art system. It is of course possible by using all the elements to obtain a time-base corrector which sends out a high-quality image completely free of vertical fluctuations even in a VTR performing noiseless slow motion reproduction or special reproduction.

With regard to the line advance/delay control in the case where the line shift was indicated as available in Table 1 and Table 2, the same effect as the above-mentioned present invention is obtained even by the control reverse to the line control explained with reference to the above-described embodiments (such as when "one line ahead" is replaced by "one line behind" in the present specification).

APPLICABILITY IN INDUSTRY

It will thus be understood from the foregoing description that according to the present invention having a construction as described above, there is provided a time-base corrector of very high practical value completely free of vertical fluctuations of the image on the monitor screen.

What is claimed is:

1. A time-base corrector comprising a memory for storing a reproduction video signal reproduced by a video tape recorder, a write/read address generator circuit for a write and read address for each line to the memory, a sync separator circuit for extracting a reproduction vertical sync signal and a reproduction horizontal sync signal from said reproduction video signal, a vertical sync signal forecasting circuit for counting a predetermined number of a signal synchronous with said reproduction horizontal sync signal and forecasting the position of a reproduction vertical sync signal in the next field, thereby to generate a forecast vertical sync signal, and a vertical sync signal compensation circuit supplied with the reproduction vertical sync signal and the forecast vertical sync signal and normally producing the reproduction vertical sync signal, said vertical sync signal compensation circuit outputting the forecast vertical sync signal in the case of dropout of the reproduction vertical sync signal, wherein the write line address of said memory is latched by the output of said vertical sync signal compensation circuit, and the signal thus latched is loaded as a read line address on the write/read address generator circuit at the position of the vertical sync signal of the external reference sync signal.

2. A time-base corrector according to claim 1, wherein the vertical sync signal forecasting circuit changes the number of the counts of the signal synchronous with the reproduction horizontal sync signal on the basis of reproduction track information at the time of special reproduction including slow motion reproduction.

3. A time-base corrector according to claim 1, wherein said vertical sync signal compensation circuit is such that a spurious vertical sync signal is introduced from the leading edge of selected one of the forecast vertical sync signal and the reproduction vertical sync signal, whichever is produced earlier, and when one of the trailing edge of the reproduction vertical sync signal and the trailing edge of the spurious vertical sync signal occurs later than the other trailing edge said one trailing edge is used as a vertical reference.

4. A time-base corrector according to claim 1, wherein a signal prepared on the basis of a video head switch signal having a switching position during the vertical blanking period before the vertical sync signal recorded near the scanning start position of the video head is used as a gate pulse, a signal immediately following the video head switching position is led out of the vertical sync signal of the reproduction video signal as a reproduction vertical sync signal, and the reproduction vertical sync signal thus led out is applied to the vertical sync signal compensation circuit.

5. A time-base corrector comprising a memory for storing a reproduction video signal reproduced from a video tape recorder, a write/read address generator circuit for generating a write and a read address for each line to said memory, a sync separator circuit for extracting a reproduction vertical sync signal and a reproduction horizontal sync signal from said reproduction video signal, a vertical sync signal forecasting circuit for counting a predetermined number of the signal synchronous with the reproduction horizontal sync signal and generating a forecast vertical sync signal by forecasting the position of the reproduction vertical sync signal in the field next to the reproduction vertical sync signal, a vertical sync signal compensation circuit supplied with the reproduction vertical sync signal and the forecast vertical sync signal and normally producing the reproduction vertical sync signal, said vertical sync signal compensation circuit outputting the forecast vertical sync signal in the absence of the reproduction vertical sync signal, a smoothing circuit for preparing the average data of the present line and the preceding line, and a field identification circuit for identifying the fields of the reproduction video signal and the external reference sync signal, wherein the write line address of said memory is latched at a first vertical reference position obtained from the vertical sync signal of the vertical video signal, the address thus latched is loaded as a read line address on the write/read address generator circuit at a second vertical reference position obtained from the vertical sync signal of the external reference sync signal, and the data from the smoothing circuit is used as read data when the fields of the reproduction video signal and the external reference sync signal are different from each other, selected one of the operation timing of selected one of latching and loading and line address being appropriately shifted by one horizontal scanning period in selected one of the cases where the reproduction video signal is an even-numbered (second, fourth) field and the external reference sync signal is an odd-numbered (first, third) field and where the reproduction video signal is an odd-numbered field and the external reference sync signal is an even-numbered field.

* * * * *